US007526263B2

(12) United States Patent
Niiranen et al.

(10) Patent No.: US 7,526,263 B2
(45) Date of Patent: Apr. 28, 2009

(54) INPUT ARRANGEMENT FOR A LOW-NOISE AMPLIFIER PAIR

(75) Inventors: Erkki Niiranen, Ii (FI); Harri Närhi, Kempele (FI); Jukka Puoskari, Tupos (FI); Pertti Koskela, Kempele (FI)

(73) Assignee: Filtronic Comtek Oy, Kempele (FI)

( * ) Notice: Subject to any disclaimer, the term of this patent is extended or adjusted under 35 U.S.C. 154(b) by 441 days.

(21) Appl. No.: 11/469,725

(22) Filed: Sep. 1, 2006

(65) Prior Publication Data

US 2007/0132528 A1 Jun. 14, 2007

Related U.S. Application Data

(63) Continuation of application No. PCT/FI2005/050062, filed on Mar. 4, 2005.

(30) Foreign Application Priority Data

Mar. 22, 2004 (FI) .................................. 20040433

(51) Int. Cl.
*G06F 3/033* (2006.01)

(52) U.S. Cl. .................... 455/130; 455/232.1; 455/334; 455/276.1

(58) Field of Classification Search ................. 455/130, 455/276.1, 232.1–253.1, 334, 341, 339
See application file for complete search history.

(56) References Cited

U.S. PATENT DOCUMENTS

| | | | |
|---|---|---|---|
| 4,168,479 | A | 9/1979 | Rubin |
| 5,023,866 | A | 6/1991 | De Muro |
| 5,222,246 | A | 6/1993 | Wolkstein |
| 2003/0011443 | A1 | 9/2003 | Liu et al. |

FOREIGN PATENT DOCUMENTS

| | | |
|---|---|---|
| FR | 2685586 | 12/1991 |
| JP | 2001186047 | 7/2001 |

*Primary Examiner*—Lana N Le
(74) *Attorney, Agent, or Firm*—Darby & Darby P.C.

(57) ABSTRACT

An arrangement for processing the antenna signal of a radio receiver and for leading it to low-noise amplifiers LNA of parallel amplifier branches. On the transmission path of the receiver from the antenna to the amplifiers LNA, functionally different elements are combined into physically united elements, such as the conductors (432, 433) of the low-passing part of the antenna filter and the division conductors of the Wilkinson divider (430), and the conductor (441) of the phase-shifter and the inductive part (L1) of the LNA matching circuit. Each physically united element is a conductor, which is insulated from the ground plane by air or a low-loss dielectric material. The arrangement reduces the number of lossy parts between the antenna and the amplifiers, and placing these parts on an ordinary circuit board is also avoided. For these reasons, inferior noise values compared to the prior art can be allowed for each LNA. In addition, the matching of the input impedance of the LNA becomes more accurate when no discrete coil is needed in it.

10 Claims, 4 Drawing Sheets

INPUT ARRANGEMENT FOR A LOW-NOISE AMPLIFIER PAIR

CROSS REFERENCE TO PRIOR APPLICATION

This is a U.S. Continuation Application of International Patent Application No. PCT/FI2005/050062, filed Mar. 4, 2004, which claims priority of Finland Patent Application No. 20040433, filed Mar. 22, 2004, both of which are hereby incorporated by reference. The International Application published in English on Sep. 29, 2005 as WO 2005/091428 A1 under PCT Article 21(2).

The invention relates to an arrangement for processing the antenna signal of a radio receiver and leading it to low-noise amplifiers. The arrangement is suitable for use on the receiving side of base stations of the mobile communication networks and in satellite receivers, for example, the low-noise amplifier unit consisting of two parallel and phased amplifier branches.

BACKGROUND OF THE INVENTION

In all radio receivers, the first amplifier after the antenna when entering the receiver should be especially low-noise type, because the signal level at the input of this amplifier is very low, and the additional noise caused by the amplifier is amplified in all the following amplifier stages. An abbreviation LNA is generally used of such a low-noise pre-amplifier. So in this description and the claims, too. Some allowed maximum value is generally specified in receivers for the total noise figure of the LNA and its input and output circuits. Losses on the transmission path cause attenuation in the signal, directly increasing the noise figure by the same amount. Therefore, for example, if the antenna filter of the receiver is very low loss, the noise figure of the LNA can be correspondingly a little higher.

FIG. 1 shows a block diagram of a common structure of the antenna side part of a receiver. In addition to the antenna and a possible antenna switch, the structure includes an antenna filter, signal divider, two parallel amplifier branches and a signal combiner. In the example of the figure, the antenna filter RXF has two parts: starting from the antenna, there is first a bandpass filter 110 and then a low-pass filter 120. The former attenuates frequency components outside the receiving band of the radio system, and the latter further cleans up the range above the receiving band. The signal $E_{in}$ coming from the low-pass filter 120 is divided in the divider 130 into two mutually identical parts $E_{11}$ and $E_{21}$. The first division signal $E_{11}$ is led to the first amplifier branch, where its phase is changed 90 degrees in a phaseshifter 140 and then amplified in the first LNA 170. The input impedance of the amplifier must naturally be matched, for which reason there is the first matching circuit 150 in its input. The first LNA outputs the signal $E_{12}$. The second division signal $E_{21}$ is led to the second amplifier branch, where it is amplified in a second LNA 180, in the input of which there is the second matching circuit 160. The phase of the signal is then changed 90 degrees in the second phase shifter PSC, which outputs the signal $E_{22}$. Again, the in-phase signals $E_{12}$ and $E_{22}$ are summed in a combiner CMB, the output signal of which, $E_{out}$, continues towards the mixer of the receiver, In addition, FIG. 1 shows also amplifier output matching circuits, which do not fall within the scope of this invention, as blocks M. Compared to a single LNA, in the arrangement described above especially the impedance matching of the antenna filter towards the amplifiers is easier. In addition, a wider dynamic and linear area and a better stability are achieved. On the other hand, the divider, the phase shifter and the additional wiring required by them cause more attenuation in the signal, which, as mentioned, directly impairs the noise figure of the LNA.

In this description and the claims, the name “front stage” is used for the parts of the receiver from the antenna to the low-noise amplifiers, including these.

FIG. 2 shows an example of a known input arrangement of an amplifier pair according to FIG. 1. It comprises a circuit board 201, the lower surface of which, not visible in the figure, is conductive and functions as the signal ground GND. The integrated antenna filter RXF comprises resonators, and its output is connected through a connector 225 on its end wall to a coaxial cable 229, which has a characteristic impedance of 50Ω. The conductive cable sheath is connected to the signal ground at both ends. The cable 229 continues on the circuit board 201 as a transmission line, which consists of a micro strip 231 on the upper surface of the board, a ground conductor on the lower surface and dielectric material between them. The transmission line is dimensioned so that its characteristic impedance is 50Ω. It belongs to the divider 230 as its input line. The divider is of the Wilkinson type, which means that the above mentioned input line branches into two transmission lines, which are called division lines here. Their length is λ/4 on the operating frequency, and their characteristic impedance is $\sqrt{2}\cdot 50 \approx 71\Omega$. The first division line is formed of the first division conductor 232 on the upper surface of the board, the ground conductor on the lower surface and dielectric material between them, and the second division line correspondingly of the second division conductor 233 on the upper surface of the board, the ground conductor on the lower surface and dielectric material between them. A Wilkinson divider is formed when the tail ends of the first and the second division conductor have been connected together by a resistor 234 of the value of $2\cdot 50 = 100\Omega$. In that case, if both transmission line branches have been terminated by an impedance of 50Ω, the energy coming from the filter is divided into them half and half, and theoretically without losses. Thus the divider does not consume energy in spite of the resistor in it. Only if the matching on the transmission paths continuing forward is inadequate, the resistor 234 causes losses. In addition, a good isolation between the branches is achieved. The first division line continues as a phase shifter, which has been implemented with a quarter-wave long transmission line. A micro strip 241 of this transmission line, which is a continuation of the first division conductor 232, is seen in FIG. 2. That micro strip ends in the first matching circuit 250 including an air core coil L1 and a chip capacitor C1 in series. The latter functions as a decoupling capacitor at the same time. The matching circuit is connected at its tail end with a short micro strip to the input pin of the first LNA 270. The second division conductor 233 is connected at its end on the side of the resistor 234 to the second matching circuit including a coil L2 and a capacitor C2 in series in the same way as in the first matching circuit. The second matching circuit is connected at its tail end with a short micro strip to the input pin of the second LNA 280.

The arrangement according to FIG. 2 has the drawback of losses that occur in it in practice: the circuit board material causes dielectric losses both in the divider 230 and the phase shifter, the value of the losses being typically 0.2-0.5 dB in the former and 0.1-0.3 dB in the latter. The transmission line 229 from the filter to the divider and its connectors cause additional losses, the value of which can be several tenths of a decibel, naturally depending on the length of the line. The losses of the matching circuits on the input side of the amplifiers are also significant. In addition, the coil of the matching circuit causes a production problem, because the variation of its inductance is so wide in practice that the impedance matching on the operating band may be insufficient. This means additional losses in the divider. Attenuation corresponding to all losses directly increases the noise figure of the amplifier unit by the same amount. Then the requirements for the LNA itself correspondingly increase, if the total noise figure must remain as low as possible.

FIG. 3 shows another example of a known input arrangement of an amplifier pair according to FIG. 1. This differs from the arrangement of FIG. 2 only for the low-pass filter, otherwise the circuit is similar. In this example, the low-pass filter 320 consists of a conductor area on the upper surface of the circuit board 301 and the planar signal ground of the lower surface. The conductor area consists of a straight and relatively narrow micro strip 321, which extends from the input of the filter to its output and in which the substantial characteristic is its inductance. The micro strip 321 has transverse enlargements on, such as an enlargement 322, the substantial characteristic of which is their capacitance in relation to the ground plane. The structure thus corresponds to an LC chain implemented by discrete components, with coils in series, and a capacitor connected to the ground between each two coils. In the example of FIG. 3, there are four "coils" and three "capacitors", in which case the order of the low-pass filter is seven. The values of the inductances and the capacitances naturally depend on the dimensioning of the parts of the conductor area, which dimensioning thus determines the filter response. The micro strip 321 of the filter 320 continues as micro strip 331, which together with the ground on the lower surface of the circuit board and the dielectric material between them forms the input line of the Wilkinson divider 330. In order to improve the mutual matching of the filter 320 and the divider 330, there is a capacitor 307 at their junction, between the micro strip on the upper surface of the circuit board and the ground.

Because of the filter solution, the arrangement of FIG. 3 is more compact than the arrangement of FIG. 2. The cabling does not cause losses in this case, but a new drawback is caused by the dielectric losses that arise at the low-pass filter in the circuit board. Here, like in the example of FIG. 2, the losses can be reduced by selecting a low-loss material, such as teflon, instead of a generally used circuit-board material. However, in that case there is a flaw of a significant increase in production costs.

SUMMARY OF THE INVENTION

It is the objective of the invention to reduce the above mentioned drawbacks of the prior art. The arrangement according to the invention is characterized in what is set forth in the independent claim 1. Some preferred embodiments of the invention are presented in the other claims.

The basic idea of the invention is the following: On the transmission path of the front stage of a receiver from the antenna to the low-noise amplifiers, functionally different elements are combined into physically united elements. In this way, the low-passing part of the antenna filter can be united with the Wilkinson divider and the phase shifter with the matching circuit of the LNA. Each physically united element is a conductor, which is insulated from the ground plane by air or some low-loss dielectric material.

The invention has an advantage that the losses of the front stage of a receiver before the low-noise amplifiers are reduced, i.e. the attenuation caused by the transmission path is reduced. This is due to that the transmission path from the antenna to the low-noise amplifiers is formed of a smaller number of lossy parts and also to that placing these parts on an ordinary circuit board is avoided. The reduction of the losses means that the noise figure of the front stage improves, in which case inferior noise values can be allowed for its both LNAs, which further means saving of costs in amplifiers. In addition, the invention has the advantage that no discrete coil is needed for the matching of the input impedance of the LNA, and the matching thus becomes more accurate. Furthermore, the invention has the advantage that it simplifies the structure of the front stage, which means saving of costs in production.

BRIEF DESCRIPTION OF THE DRAWINGS

In the following, the invention will be described in more detail. Reference will be made to the accompanying drawings, in which.

DETAILED DESCRIPTION OF THE INVENTION

Figure 1:
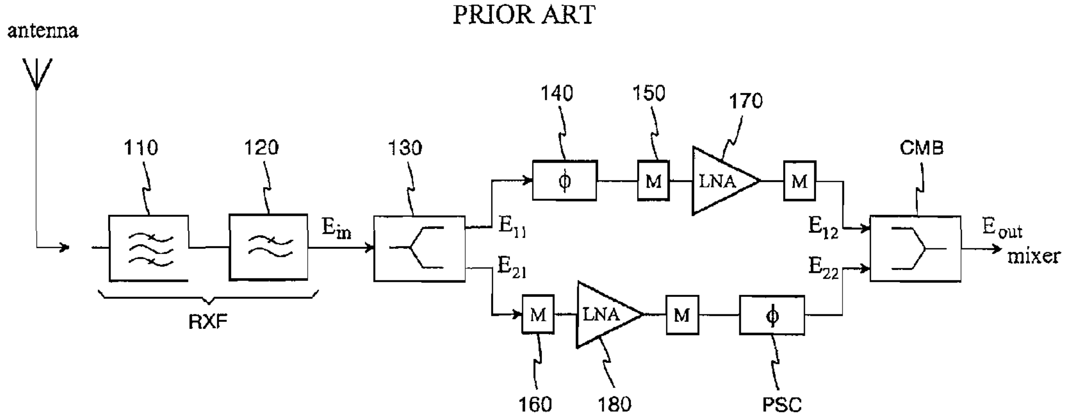
Fig. 1 PRIOR ART
FIG.1 shows as a block diagram of a common structure of the antenna side part of a receiver.
Figure 2:
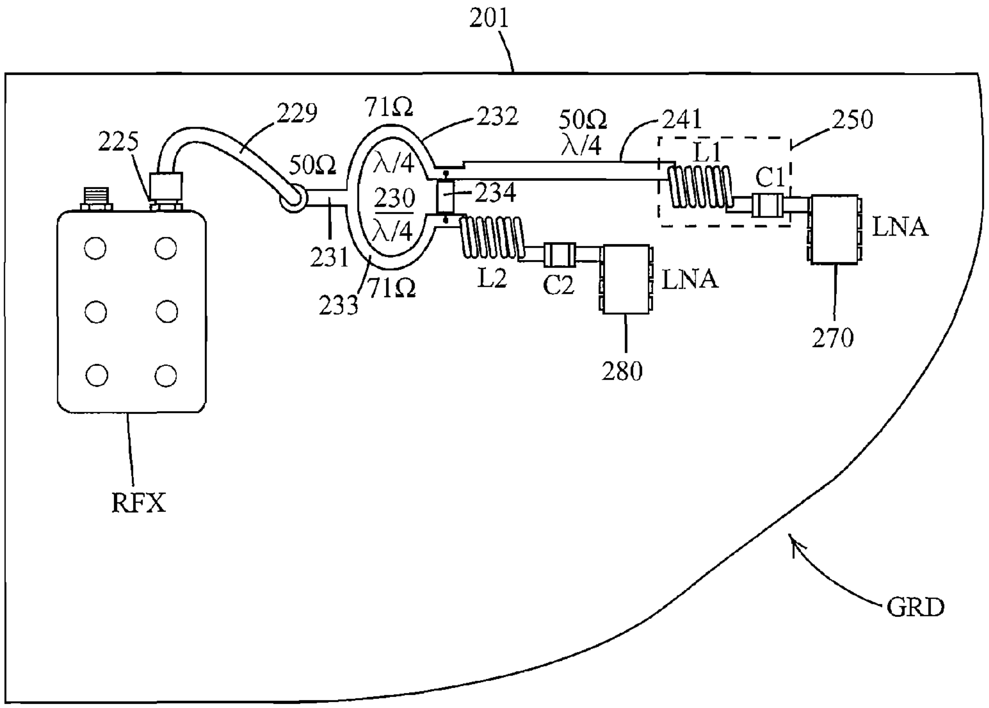
Fig. 2 Prior Art
FIG. 2 shows an example of a known input arrangement of an amplifier pair according to FIG. 1.
Figure 3:
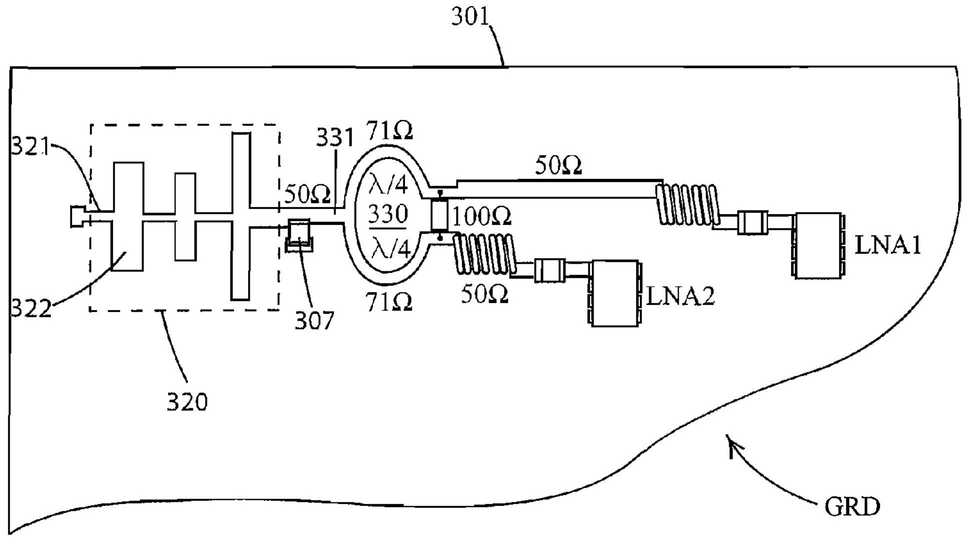
Fig. 3 Prior Art
FIG. 3 shows another example of a known input arrangement of an amplifier pair according to FIG. 1.

FIGS. 1, 2 and 3 were already explained in connection with the description of the prior art.

Figure 4:
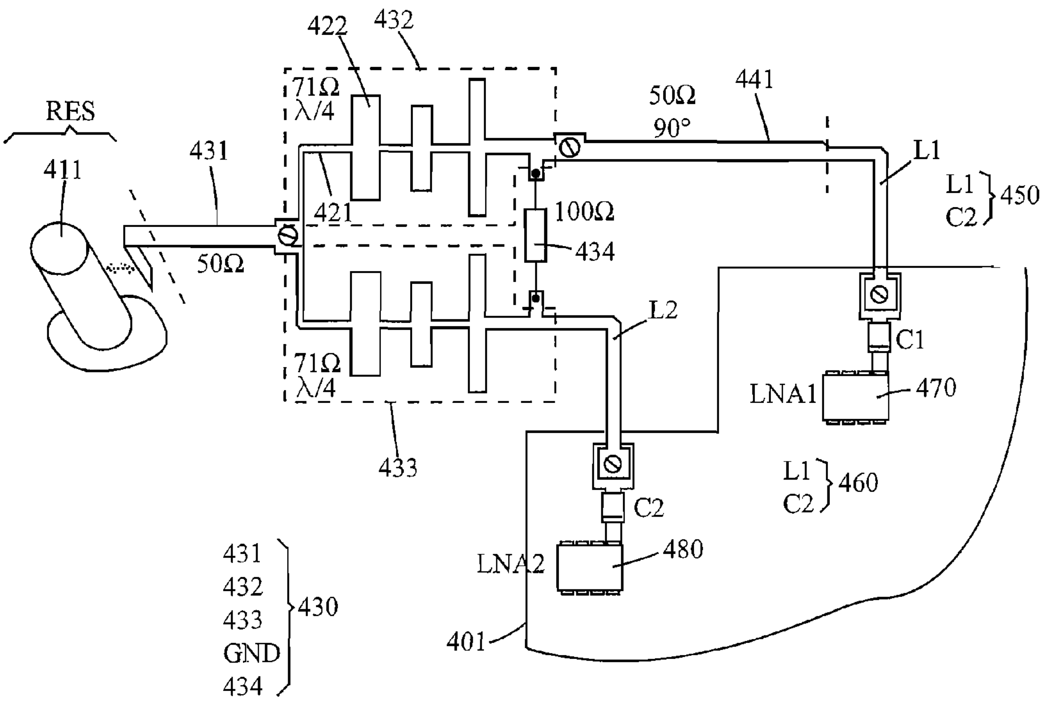
FIG. 4 shows an example of an input arrangement of an amplifier pair according to the invention.

FIG. 4 is an example of the input arrangement of an amplifier pair according to the invention. This implements the same functions as the arrangements of the previous figures, but with a different structure. The filter corresponding to the bandpass filter 110 in FIG. 1 is of the resonator type, of which the inner conductor 411 of its output resonator RES is seen. The input conductor 431 of the divider 430 extends to the cavity of the output resonator. The part of the input conductor 431 in the cavity has an electromagnetic coupling to the output resonator, through which the energy of the signal coming from the antenna is transferred to the divider. Alternatively, the input conductor could be galvanically coupled directly to the inner conductor 411. The divider is of the Wilkinson type, and in addition to the input conductor 431, the first division conductor 432, the second division conductor 433 and a resistor 434 connected between the tail ends of the division conductors are seen in FIG. 4. Said three conductors are fairly rigid strip conductors. They form a united piece, which is fastened and supported on the conductive frame of the device as insulated therefrom. The frame is not shown in FIG. 4; only screw heads are shown of the fastening. The frame functions as a signal ground GND, at the same time. The distance of the strip conductors from the ground is such that the impedance of the input line formed by the input conductor and the ground is about 50Ω in this example, too, and the impedance of the division lines formed by the division conductors and the ground is about 71Ω as "viewed" from the end of the line.

The low-pass filtering of the signal takes place in the divider according to the invention so that its both division lines also function as filters, at the same time. The division conductors have been shaped in the same way as the conductor area of the low-pass filter 320 seen in FIG. 3 and described above. Thus there is a relatively narrow central part 421 in the first division conductor 432, and transverse enlargements thereof, such as an enlargement 422, so that the conductor together with the signal ground corresponds to an LC chain made by discrete components. The filters formed by the first and the second division line are identical.

The first division line continues as a phase shifter, which has been implemented with a quarter-wave long transmission line, which is formed of the conductor 441 seen in FIG. 4 and the ground conductor, or signal ground, or ground. Here and in the claims as well, the pair conductor of the ground conductor of the phase shifter is called the "upper conductor", where the qualifier "upper" does not limit the position of the device in any way. The upper conductor 441 ends in the first matching circuit 450 including a conductor L1 with a certain inductance and a chip capacitor C1 in series. The tail end of the conductor LI extends to the circuit board 401 of the device, on which circuit board the capacitor C1 is. This is connected with a short micro strip to the input pin of the first LNA 470. The second division conductor 433 is connected at its tail end, or the end on the side of the resistor 434 to the second matching circuit 460, which is identical to the first matching circuit. The tail end of the inductive conductor L2 of the second matching circuit also extends to the circuit board 401, where its serial capacitor C2 is. The second matching circuit 460 is at its tail end connected with a short micro strip to the input pin of the second LNA 480.

The upper conductor 441 of the phase shifter, the inductive conductor L1 of the first matching circuit and the inductive conductor L2 of the second matching circuit are in this example similar fairly rigid, air-insulated strip conductors as the strip conductors of the divider 430. The strip conductors 441 and L1 form a united strip. The strip has a point of discontinuity where the phase shifter proper ends, and the relation of the strip conductor L1 to the ground differs from the relation of the strip conductor 441. In spite of these matters, the phase shift function and the matching function are not strictly separate with regard to the location, but overlapping. As can be seen, no discrete coil is needed in the matching circuit, which means an improvement in the accuracy of the matching. The same naturally also applies in the second matching circuit 460. Another significant advantage as compared to the structure of FIG. 3 is that the losses of the low-pass filter and the divider are substantially smaller. This is due to the air insulation of the conductors and that the filter is combined with the divider.

Figure 5:
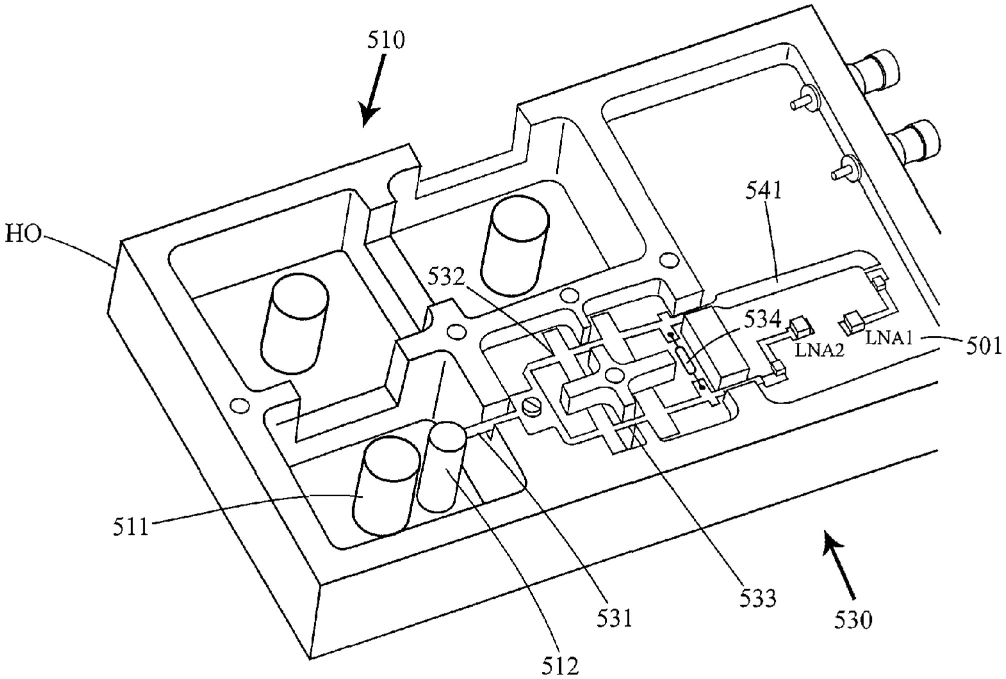
FIG. 5 shows another example of an input arrangement of an amplifier pair according to the invention.

FIG. 5 shows another example of the input arrangement of an amplifier pair according to the invention. The figure shows a metal housing HO with its cover removed. The housing contains the bandpass part 510 of the antenna filter, the divider 530 and the circuit board 501. The bandpass filter 510 is formed so that the inner space of the housing HO is divided by conductive partition walls into resonator cavities, between which there are coupling holes. Each resonator cavity includes an inner conductor of a coaxial-type resonator, such as the inner conductor 511 of the output resonator. Two of the cavities confined by partition walls do not serve as resonators; one of them contains the divider 530 and another one the circuit board 501. The cavity of the divider is beside the output resonator. The input conductor 531 of the divider extends through an opening in the partition wall to the output resonator, a coupling element 512 therein. In this example, the coupling element is a cylindrical conductor parallel with the inner conductor of the resonator and galvanically connected to the bottom of the resonator. The coupling element 512 has an electromagnetic coupling to the output resonator, through which coupling the energy of the signal coming from the antenna is transferred to the divider. The divider is of the Wilkinson type, and the parts seen of it in addition to the input conductor 531 are the first division conductor 532, the second division conductor 533 and a resistor 534 connected between the tail ends of the division conductors. These three conductors are strip conductors, and they are supported to the bottom defining the cavity, as insulated therefrom, like the corresponding conductors of the divider in FIG. 4 to the frame mentioned in the description of FIG. 4. The distances of the strip conductors from the housing that functions as the signal ground are also in this case such that the impedance of the division lines formed by the division conductors and the ground is about $\sqrt{2}$ times the impedance of the input line formed by the input conductor and the ground.

The low-pass filtering of the signal takes place like in the example of FIG. 4 so that both division lines of the divider function as filters, at same time. Both division conductors 532, 533 together with the signal ground thus correspond to a low-passing LC chain made by discrete components. The upper conductor 541 of the phase shifter is, unlike the conductor 441 in FIG. 4, a micro strip on the surface of the circuit board 501.

For this reason, the phase shifter is in this example lossier than in the example of FIG. 4. The first and the second LNA, or LNA1 and LNA2 are also seen on the circuit board 501.

Figure 6:
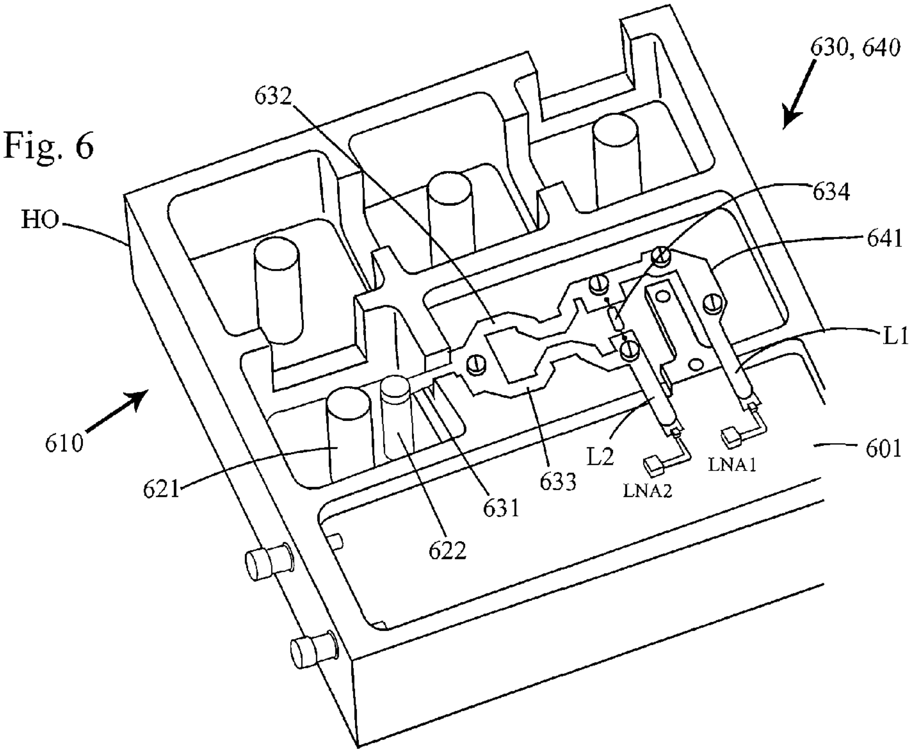
FIG. 6 shows a third example of an input arrangement of an amplifier pair according to the invention.

FIG. 6 shows a third example of the input arrangement of an amplifier pair according to the invention. The figure shows a metal housing HO with its cover removed. The housing contains the bandpass part 610 of the antenna filter, strip conductors belonging to the divider, phaseshifter and matching circuits, and a circuit board 601. The low-pass part of the antenna filter is not visible in FIG. 6. The bandpass filter 610 is formed so that the inner space of the housing HO is divided by conductive partition walls into resonator cavities, between which there are coupling holes. Each resonator cavity includes an inner conductor of a coaxial-type resonator, such as the inner conductor 621 of the output resonator. Of the cavities confined by the partition walls, two do not serve as resonators, one of them contains the divider 630 and the phaseshifter 640 and another contains the circuit board 601. The cavity of the divider is beside the output resonator. The input conductor 631 of the divider extends through an opening in the partition wall of the cavities to the output resonator, a coupling element 622 therein. The coupling element is a cylindrical conductor parallel with the inner conductor of the resonator, galvanically connected to the bottom of the resonator, like in FIG. 5. In the same way, the coupling element 622 has an electromagnetic coupling to the output resonator, through which coupling the energy of the signal coming from the antenna is transferred to the divider. In addition to the input conductor 631, the first division conductor 632, the second division conductor 633 and a resistor 634 connected between the tail ends of the division conductors are seen of the Wilkinson divider. These three conductors are strip conductors, and they are supported on the bottom confining said cavity, insulated therefrom like in the divider of FIG. 5. Because the low-pass filter is made by coaxial resonators, in this example the division conductors 632 and 633 serve only the signal dividing function. Instead, the upper conductor 641 of the phase shifter and the inductive part L1 of the first matching circuit are integrated into a united strip conductor in accordance with the invention. The conductor L1 extends at its tail end to said circuit board 601, where the amplifiers LNA1 and LNA2 are. Correspondingly, the inductive part L2 of the second matching circuit is a strip conductor, which extends from the tail end of the second division conductor 633 to the circuit board 601.

In the structure of FIG. 6, circuit board losses have been eliminated in the same way as in the structure of FIG. 4. Similarly, the need for a discrete coil in the matching circuits has also been eliminated, which means an improvement in matching accuracy.

Figure 7:
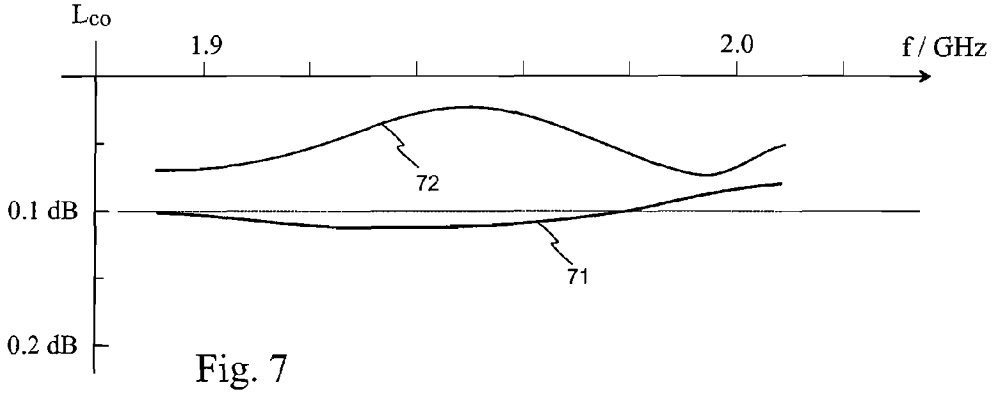
FIG. 7 shows an example of coupling losses of the divider in an arrangement according to the invention.

FIG. 7 shows an example of the coupling losses $L_{co}$ of a divider according to FIGS. 4 and 5 on the receiving band. Here the coupling losses mean an attenuation that exceeds the attenuation of 3.03 dB inevitably caused by halving the signal. Curve 71 shows the coupling losses in the first branch of the divider, which continues to the phaseshifter. The losses are approx. 0.1 dB. Curve 72 shows the coupling losses in the second branch of the divider. In it the losses vary in the range 0.02-0.07 dB being thus even smaller than in the first branch.

Figure 8:
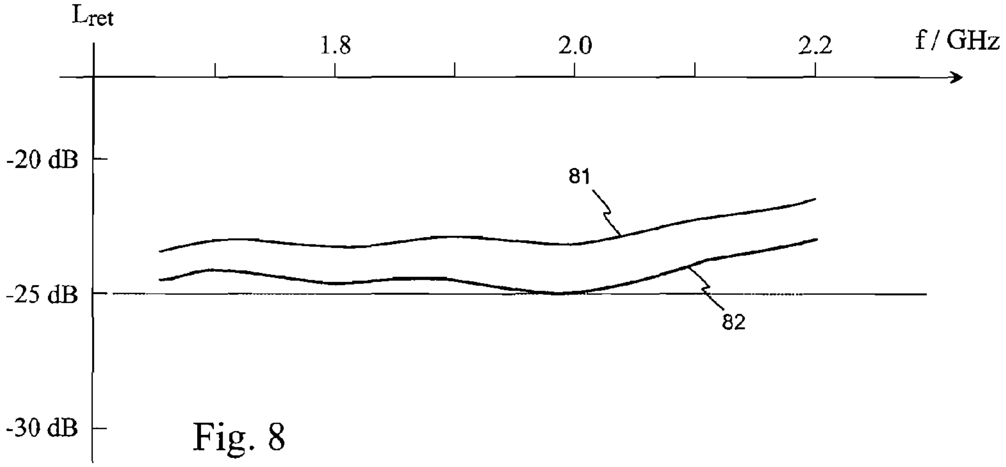
FIG. 8 shows an example of the return attenuation in the output ports of the divider in an arrangement according to the invention.

FIG. 8 shows an example of the return attenuation $L_{ret}$ in the output ports of the divider in the arrangement according to the invention on the receiving band. Here the return attenuation describes the quality of the matching as viewed forward from the divider; the higher return attenuation, the better. Curve 81 shows the return attenuation at the tail end of the first branch of the divider. The attenuation varies from 21.7 to 23.2 dB in the range 1.7-2.2 GHz. Curve 82 shows the return attenuation at the tail end of the second branch. There the attenuation varies from 23 to 25 dB , being thus even better than at the tail end of the first branch. The results were gained from a prototype piece, and they can naturally be improved by optimising the dimensioning.

Figure 9:
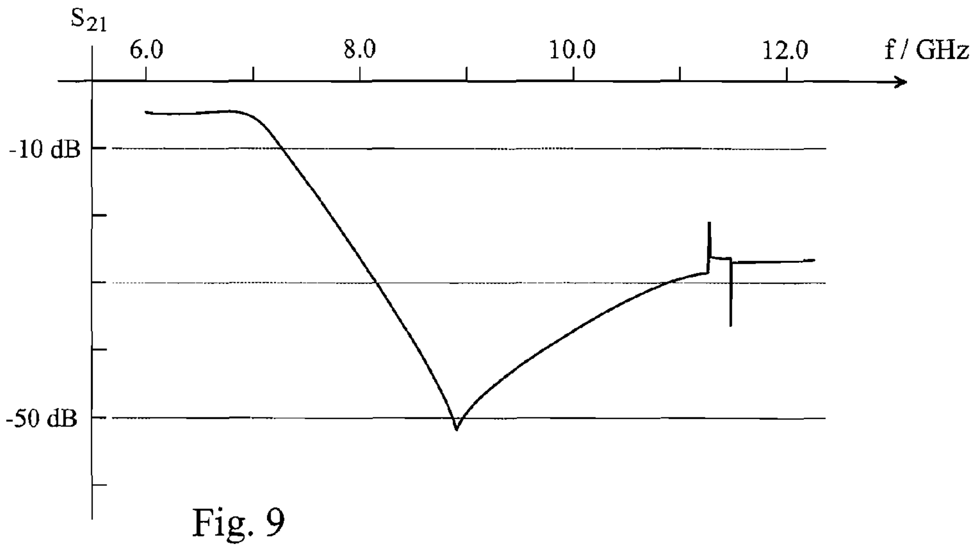
FIG. 9 shows an example of the attenuation in a low-pass filter combined with the divider according to the invention.

FIG. 9 is an example of the transmission coefficient $S_{21}$ of a low-pass filter combined with the divider according to the invention, i.e. its attenuation. The purpose of the low-pass filter is to attenuate frequency components that possibly occur at such high frequencies at which the stopband attenuation of the band-pass filter is not sufficient. The cut-off frequency of the filter of the example is about 7 GHz. The peak attenuation, the value of which is approx. 52 dB , is arranged at the frequency 8.9 GHz. Upward from this the attenuation decreases, but remains at almost 30 dB . On the receiving band, which is not seen in the figure, the attenuation is very close to zero.

Examples of the arrangement according to the invention have been described above. The invention is not limited to them only. For example, the low-pass filter can also be united with the input line of the divider in a similar manner as it is in FIGS. 4 and 5 united with the division lines. Instead of air-insulated strip conductors, the conductors of the divider and the phase shifter can also be micro strips on the surface of a low-loss dielectric board. Low-loss material is more expensive than ordinary circuit board material, but on the other hand the size of the board required is relatively small, The inventive idea can be applied in many ways within the limits set by the independent claim 1.

The invention claimed is:

1. Input arrangement for a low-noise amplifier pair in a front stage of a radio receiver, which comprises as functional units a phase shifter, a first matching circuit and a first LNA belonging to a first amplifier branch, a second matching circuit, a second LNA and a second phase shifter belonging to the second amplifier branch, a bandpass filter, a low-pass filter, a divider, wherein on transmission path of the front stage from antenna to the first and the second LNA, at least parts belonging to a first and a second functional unit are physically united to a single element to reduce attenuation caused by said transmission path and to improve matching.

2. An arrangement according to claim 1, where the divider is a Wilkinson type divider, which has an input line comprising an input conductor and a ground conductor, or ground, and a first and a second division line, each of which comprises a division conductor and ground conductor, the first functional unit being said low-pass filter and the second functional unit being said divider, in which case each division line of the divider is a low-pass filter at the same time.

3. An arrangement according to claim 2, where the phase shifter is a transmission line comprising an upper conductor and a ground conductor, and the first matching circuit is implemented by an inductive element and, in addition, some parts belonging to a third and a fourth functional unit are physically united to a single element, which third functional unit is said phase shifter and the fourth functional unit is said first matching circuit, in which case the upper conductor and the inductive element form a united element.

4. An arrangement according to claim 3, at least some of said conductors being micro strips on a surface of a relatively low-loss dielectric board.

5. An arrangement according to claim 2, wherein, to form said low-pass filter, a division conductor comprises a conductor extending from its input to the output, the substantial characteristic of which is its inductance, and transverse enlargements of this conductor, the substantial characteristic of which is their capacitance in relation to the ground.

6. An arrangement according to claim 2, said input conductor and division conductors being conductor strips substantially air-insulated from the signal ground.

7. An arrangement according to claim 2, at least some of said conductors being micro strips on a surface of a relatively low-loss dielectric board.

8. An arrangement according to claim 1, where the phase shifter is a transmission line comprising an upper conductor and a ground conductor, and the first matching circuit is implemented by an inductive element, the first functional unit being said phase shifter and the second functional unit being said first matching circuit, in which case the upper conductor and the inductive element form a united element.

9. An arrangement according to claim 8, said united element formed by the upper conductor and the inductive element being a conductor strip substantially insulated from the signal ground.

10. An arrangement according to claim 8, at least some of said conductors being micro strips on a surface of a relatively low-loss dielectric board.

* * * * *